United States Patent
Locklear et al.

(10) Patent No.: US 11,573,186 B2
(45) Date of Patent: Feb. 7, 2023

(54) TESTING H$_2$S SCAVENGERS' POLYMERIZATION FACTORS

(71) Applicant: ConocoPhillips Company, Houston, TX (US)

(72) Inventors: Jay E. Locklear, Houston, TX (US); Clinton L. Crowe, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 35 days.

(21) Appl. No.: 17/338,104

(22) Filed: Jun. 3, 2021

(65) Prior Publication Data

US 2021/0389255 A1    Dec. 16, 2021

Related U.S. Application Data

(60) Provisional application No. 63/039,781, filed on Jun. 16, 2020.

(51) Int. Cl.
*G01N 21/80* (2006.01)
*C09K 8/54* (2006.01)
(Continued)

(52) U.S. Cl.
CPC ............... *G01N 21/80* (2013.01); *C08F 2/00* (2013.01); *C09K 8/524* (2013.01); *C09K 8/54* (2013.01);
(Continued)

(58) Field of Classification Search
CPC ....... G01N 21/80; C08F 2/00; C08F 2400/02; C09K 8/524; C09K 8/54; C09K 2208/20;
(Continued)

(56) References Cited

U.S. PATENT DOCUMENTS 8,920,568 B2   12/2014  Taylor
2009/0227729 A1*  9/2009  Burden .................. C08F 10/00
                                                           524/570

(Continued)

FOREIGN PATENT DOCUMENTS

WO      2018001604           1/2018
WO      WO-2021257288 A1 *  12/2021  ............. C09K 8/524

OTHER PUBLICATIONS

Taylor, G. N.; Prince P.; Matherly, R.; Ponnapati, R.; Tompkins, R.; Vaithilingam, P. Identification of the molecular species responsible for the initiation of amorphous dithiazine formation in laboratory studies of 1,3,5-Tris(hydroxyethyl-hexahydro-s-triazine as a hydrogen sulfide scavenger. Industrial & Engineering Chemical Reserach. 2012, 51, 11613-11617.

(Continued)

*Primary Examiner* — Pamela H Weiss
(74) *Attorney, Agent, or Firm* — Boulware & Valoir

(57) ABSTRACT

Scavenging chemicals used in mitigation treatments of hydrogen sulfide in hydrocarbon streams often continue to react and form polymers that foul the processing system. Disclosed herein are methods for determining if a scavenging chemical mitigator, or its reaction or degradation product, will polymerized during or after mitigation treatments. This information allows for the optimization of mitigation treatments that pre-emptively control or prevent polymer formation. Such pre-emption measures reduce the cost and time related to remedial actions to treat polymer-fouled equipment.

20 Claims, 6 Drawing Sheets

(51) Int. Cl.
- *C09K 8/524* (2006.01)
- *C10G 29/28* (2006.01)
- *C08F 2/00* (2006.01)

(52) U.S. Cl.
CPC .......... *C10G 29/28* (2013.01); *C08F 2400/02* (2013.01); *C09K 2208/20* (2013.01); *C09K 2208/32* (2013.01); *C10G 2300/202* (2013.01); *C10G 2300/4075* (2013.01)

(58) Field of Classification Search
CPC ...... C09K 2208/32; C09K 8/52; C10G 29/28; C10G 2300/202; C10G 2300/4075; B01D 2251/80; B01D 53/52
See application file for complete search history.

(56) References Cited

U.S. PATENT DOCUMENTS

| | | |
|---|---|---|
| 2015/0068981 A1 | 3/2015 | Beckers |
| 2016/0332093 A1 | 11/2016 | McKee |
| 2018/0345212 A1 | 12/2018 | Filepe |

OTHER PUBLICATIONS

Taylor, G. N.; Matherly, R. Structural elucidation of solid byproduct from the use of 1,3,5-Tris(hydroxyalkyl)hexahydro-s-triazine based hydrogen sulfide scavengers. Industrial & Engineering Chemical Reserach. 2011, 50, 735-740.

\* cited by examiner

FIGURE 7

| Variable of interest | Control Sample: No solvent, no heating, DTA at 2000 ppm |
|---|---|
| Type of Solvent | Sample 1: MEA, no heating, DTA at 2000 ppm<br>Sample 2: MeOH, no heating, DTA at 2000 ppm<br>Sample 3: TEG, no heating, DTA at 2000 ppm |
| Reaction Temperature | Sample 4: 23 °C, no solvent, DTA at 2000 ppm<br>Sample 5: 57°C, no solvent, DTA at 2000 ppm<br>Sample 6: 103°C, no solvent, DTA at 2000 ppm |
| DTA Concentration | Sample 7: 5000 ppm, no heating, no solvent<br>Sample 8: 10000 ppm, no heating, no solvent<br>Sample 9: 12500 ppm, no heating, no solvent |

// TESTING H₂S SCAVENGERS' POLYMERIZATION FACTORS

PRIOR RELATED APPLICATIONS

This application claims priority to U.S. Ser. No. 63/039,781, filed Jun. 16, 2020 and incorporated by reference in its entirety for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure relates generally to hydrogen sulfide mitigation treatment. Specifically, methods of screening chemical mitigators to determine if the chemicals or their reaction products will polymerize in hydrocarbon-containing streams after mitigation, and methods of screening components or compositions for modifying the polymerization are disclosed. Avoiding polymerization averts costly cleaning efforts to reduce or eliminate the problematic polymerization products, and ensures that hydrogen sulfide mitigation treatment remains cost effective.

BACKGROUND OF THE DISCLOSURE

Hydrocarbon fluids and gases often contain a variety of sulfur compounds. When sulfur is present in concentrations of 1 percent or more by weight, the hydrocarbon is characterized as "sour," whereas concentrations of 0.5 percent or less are "sweet" hydrocarbons. It is well known that sulfur compounds contained in hydrocarbon streams are corrosive and damaging to metal equipment, particularly copper and copper alloys. Sulfur has shown a particularly corrosive effect on equipment such as brass valves, gauges and in-tank fuel pump copper commutators.

One such destructive sulfur compound is hydrogen sulfide ($H_2S$). Hydrogen sulfide is a toxic, corrosive gas produced through the breaking down of organic sulfur compounds by sulfate-reducing bacteria (SRBs). Once hydrogen sulfide is detected in a hydrocarbon stream, it is necessary to mitigate hydrogen sulfide's impacts and bring the hydrocarbon stream to the desired specifications. Unfortunately, hydrogen sulfide is not found in isolation, but together with methane, hydrogen and higher hydrocarbons, as well as traces of nitrogen-, oxygen-, calcium-, and metal-containing species, all of which complicate the selection of the most suitable hydrogen sulfide mitigation technique.

There are multiple biological, chemical, and mechanical/operational (physical) mitigation techniques from which to choose amongst, according to the hydrocarbon stream characteristics, hydrogen sulfide concentration, economic considerations, and other variables. Biological mitigation techniques focus on removing hydrogen sulfide from water in wastewater treatment plants, but have not been used for hydrocarbon streams.

Mechanical mitigation techniques include releasing hydrogen sulfide into the atmosphere at wellheads, pumps, piping, separation devices, oil storage tanks, and water storage vessels. Flaring is also used to burn gases that would otherwise present a safety problem. It is common to flare natural gas that contains hydrogen sulfide to convert the hydrogen sulfide gas into less toxic compounds.

The oil and gas industry has previously utilized nitrogen stripping systems to remove the hydrogen sulfide. Nitrogen is an inert gas that prevents the flammable gases from igniting and thus eliminates the risk of explosion. Once the hydrogen sulfide has been separated from the gas, it can be converted to a waste product that can safely be disposed of or it can be used in the manufacturing of sulfur. However, it is difficult and costly to transport the liquid nitrogen that these stripping systems need. Thus, physically stripping hydrogen sulfide from hydrocarbon streams may not be cost effective.

Chemical mitigation techniques utilize additives to scavenge and absorb hydrogen sulfide. Caustic soda wash absorbs and removes small quantities of hydrogen sulfide from natural gas and refinery gases. Additionally, iron oxide, either fixed in an Iron Sponge or free flowing, is used to scavenge and remove hydrogen sulfide and mercaptans from natural gas.

Another class of scavengers are formaldehyde releasing chemicals called triazines. Triazines react with hydrogen sulfide to provide a substantially non-toxic compound or a compound which can be removed from the hydrocarbon. Currently, the most frequently used triazine hydrogen sulfide scavengers are hexahydrotriazines, including monoethanolamine (MEA) triazine and methylamine (MMA) triazine. These triazines are effective scavengers that are available at reasonable cost and are readily deployable in scrubbers or in a production train that can be physically located adjacent to hydrocarbon sources such as gas wells.

Though triazines are the most popular chemical mitigators, they do have some disadvantages. FIG. 1A displays the chemical reaction between MEA triazine and hydrogen sulfur. The triazine reacts with hydrogen sulfide, resulting in the release of an MEA 'arm'. Under extreme conditions that are not present at all hydrocarbon-containing reservoirs, the reaction is able to proceed until trithiane forms.

When the MEA triazine is spent to a high level, or when the reaction with hydrogen sulfide has proceeded very far along its pathway, the dithiazine reaction product exceeds its solubility in the aqueous medium and comes out of solution as a highly dense layer. Once formed, this dense liquid layer can undergo one of two outcomes. It may simply crystallize to the monomeric species in large cubic crystals, as has been isolated and observed in field fluids. Under certain conditions, however, dithiazine may undergo a secondary, polymerization reaction that involves opening of the dithiazine ring to form amorphous dithiazine, a highly insoluble polysulfide, per FIG. 1B.

Amorphous dithiazine deposits present a significant problem to the gas processing industry. The deposits can form blockages in gas processing equipment, storage tanks, truck tanks, and water disposal wells. Cleanup procedures are time consuming and difficult. Often, the equipment has to be taken off-line so the deposits can be manually chipped away. This makes cleaning up amorphous dithiazine deposits an expensive venture.

U.S. Pat. No. 8,920,568 discloses a method of treating the amorphous dithiazine buildup with a solution of hydrogen peroxide. The hydrogen peroxide reacts with the amorphous dithiazine at temperatures between 65-70° C. and breaks apart the buildup for easy removal. Peroxides alone, however, are very aggressive to oil and gas assets, and cannot be used without the necessary additives designed to mitigate these negative effects. WO2018001604 teaches the use of an organic peroxide as an amorphous dithiazine dissolver, together with a selected corrosion inhibitor to avoid corrosion of oil field equipment. However, removal of the dithiazine deposits is still costly and time consuming even with these methods.

What is needed in the art is a simple and safe method for testing for conditions that lead to polymerization of chemical mitigators or their reaction products such that steps can be taken to prevent the formation of polymer deposits and/or such steps optimized. If amorphous dithiazine, or other polymers with solubility problems, do not form, there is no need to take remedial action. Ideally, this method is reliable with a high throughput to quickly screen various conditions, components, or compositions in the ongoing mitigation of hydrogen sulfide downstream, midstream or upstream.

SUMMARY OF THE DISCLOSURE

Described herein are methods for determining if chemicals, such as triazines, bis-oxazolidines, and other formaldehyde-based scavengers, used for mitigation of hydrogen sulfide in fluids will continue to react after mitigation treatments to form polymers that deposit and foul the equipment.

During mitigation treatments, triazines and bis-oxazolidines scavengers react with the hydrogen sulfide to remove it from the fluids. These sulfide scavengers are often added in excess to ensure complete removal of the hydrogen sulfide. However, the reaction products or degradation of the spent scavengers, such as formaldehyde, amines, or dithiazine (DTA), are capable of forming polymers that can foul equipment under the right conditions and often in the presence of hydrogen sulfide.

The presently described methods combine known amounts of the reactants for the mitigation process (e.g. one or more chemical sulfide scavenger(s) plus a sulfide source), reaction products, and/or degradation product(s) with optional components or additives such as solvents, buffers, acids/bases, salts, alcohols, amines (primary, secondary, tertiary and quaternary), water soluble polymers, and dispersants to form test mixtures.

These test mixtures are then processed under various conditions and analyzed using e.g., spectroscopy to determine if polymers form and, if so, quantify the amount of polymer formation to determine if it is likely to deposit on the equipment. This results in a reliable, high throughput screening method for determining which treatment conditions, components, or compositions will inhibit or induce polymerization.

Once the degree of polymer formation is known for specific treatment conditions, pre-emptive measures to reduce polymer fouling can be selected and performed before or during the hydrogen sulfide mitigation treatments. These pre-emptive measures are typically time and cost effective compared to any post-polymerization remedial efforts to clean fouled equipment.

An advantage of the present methods is that they are high throughput analyses, allowing the screening of a large number of conditions at the same time. Once the samples are processed, they are analyzed using common analytical instrumentation. In some embodiments, spectroscopic techniques are used for analysis. It takes mere minutes to obtain an absorbance measurement using a spectroscopic technique such as ultraviolet-visible ("UV-VIS") or Raman spectroscopy. Thus, pH, treatment temperatures, reaction times, concentration and identity of polymerization inhibiting additives, concentration and identity of solvents, and the like can be systematically varied and tested rapidly to determine its effect on the polymerization. This allows for the quick determination of adjustments that can be made to the mitigation treatment process to reduce or eliminate polymer fouling.

In other embodiments, turbidity meters are used for analysis as they too measure a loss in a light beam intensity as it passes through a sample. Chromatographic techniques and mass spectrometry can also be used separately or in combination to analyze the processed samples to measure polymer presence and/or concentration.

In some embodiments, UV-VIS is utilized for the high throughput analyses. Any wavelength, or range of wavelengths, can be used as long as there is no molecular absorption interfering with the signal. In some embodiments, absorption measurements are taken at 900 nm as most organic molecules do not absorb this wavelength. Thus, any reduction in the light transmission will be due to the particles in the solution scattering light. The absorption measurements for each sample can be compared to an appropriate blank sample to measure the degree of polymer formation, including reduction or inhibition of polymer formation.

A further advantage is the testing of various reaction mixtures and conditions in a low-risk small scale environment. This allows for observation of dangerous mixtures and other hazards, without fouling expensive equipment, as well as quick testing of measures to reduce or eliminate polymerization and other reactions resulting in the fouling of production equipment. Once appropriate measures are determined to prevent or reduce polymerization, the measures can be scaled up to higher-risk production environments.

Any pre-emptive measure can be taken before or during the mitigation treatment of hydrocarbon-containing fluids once the extent of polymerization has been determined in the small scale tests. By way of example, a pre-emptive measure that can be taken before hydrogen sulfide mitigation treatments is combining a selection of mitigation chemicals and polymerization inhibiting additives to offset or reduce polymer formation while reducing or removing hydrogen sulfide. Alternatively, as some of these polymerization reactions are temperature dependent, the fluid to be treated can be cooled before being scrubbed, or during mitigation treatment, to prevent or reduce polymerization. This also allows for very high scavenger spend rates with little to no polymer fouling. Other pre-emptive methods of reducing polymerization include adjusting the pH or over-injecting the scavenger. In over-injecting the scavenger, about 35-40% of the scavenger will be used to scavenge the hydrogen sulfide while the remaining 60-65% prevents polymerization.

The methods are applicable to all hydrocarbon streams, including crude and refined, that are fluids (liquid and gas). However, it should be expected that certain pre-emptive measures will work better for some hydrocarbon streams, temperatures, and/or pH conditions.

The present methods include any of the following embodiments in any combination(s) of one or more thereof:

A method of identifying conditions that influence (e.g., reduce, eliminate, induce or otherwise modify) polymer formation in sulfide scavenger treatments comprising the steps of preparing an array of samples wherein each sample has a sulfide scavenger and a sulfide in a buffer and, optionally, at least one additional component, and processing the samples to induce polymer formation.

At least one parameter in one or more samples in the array is varied, including pH, processing temperature, processing time, concentration and identity of sulfide scavenger, concentration and identity of sulfide, and concentration and identity of the additional component. In some instances, two or more parameters may be modified at once, but it generally preferred to change a single parameter at a time. Each sample may also be present in duplicate, triplicate, or more.

After processing, the samples are analyzed to measure degree of polymer formation. One or more parameter(s) that reduce polymer formation is/are selected and can either be retested to further optimize the treatment or can be implemented as is into the sulfide mitigation treatment. For example, if we find that one reagent seems to reduce fouling at low pH and cooler temperatures, that same reagent can be tested at a range of low pH and temperature values to determine what the optimal conditions of usage are.

A method of optimizing a sulfide mitigation treatment comprising the steps of preparing an array of samples wherein each sample has dithiazine in a buffer and, optionally, at least one additional component, and processing the samples to induce polymer formation. At least one parameter in each of one or more samples in the array is varied, including e.g., pH, processing temperature, processing time, concentration of dithiazine, and concentration and identity of the additional component(s). The samples are then analyzed to measure the degree of polymer formation. The cycle is repeated as needed for optimization, and one or more parameter(s) that minimize or eliminate polymer formation is then selected and implemented into the now optimized sulfide mitigation treatment.

A method for analyzing an array of samples, comprising the steps of preparing an array of samples wherein each sample has a formaldehyde-releasing sulfide scavenger and a sulfide in a buffer and, optionally, at least one additional component. Next, processing the samples to induce polymer formation by heating the samples for a period of time and then cooling the samples to a temperature of 30° C. or less for a period of time. At least one parameter in one or more samples in the array is varied, including e.g., pH, heating temperature, heating time, concentration and identity of formaldehyde-releasing sulfide scavenger, concentration and identity of sulfide, or concentration and identity of the additional component. The reaction product for each sample in the array of samples is then analyzed to detect formation of a polymer. Additional steps such as determining which parameter(s) minimize or eliminate polymer formation and implementing the parameter into a sulfide mitigation treatment can be taken to optimize the scavenging/mitigation treatment.

A method of quantifying polymer formation comprising the steps of preparing an array of reaction samples wherein each reaction sample has dithiazine and at least one additional component in a buffer and preparing at least one blank sample with dithiazine in the buffer. The samples are then processed to form a reaction product within each sample and analyzed to measure the degree of polymer formation in the reaction product of each reaction sample using UV-VIS compared to the blank sample. For the reaction samples, parameters that may minimize polymer formation in the reaction product can be varied, including e.g., the pH, concentration of dithiazine, concentration and amount of each additional component, heating temperature, heating time, heating rate, cooling temperature, and/or cooling time.

Any method herein described, wherein the additional component is a solvent, an acid, a base, a dispersant, a salt, an alcohol, amines (primary, secondary, tertiary and quaternary), water soluble polymers or combinations thereof.

Any method herein described, wherein the processing step includes heating the samples at a known heating rate to a known temperature for a known amount of time; and, cooling the samples to a temperature at or below 30° C. for a known amount of time. The processing step can further comprise varying a processing parameter in one or more samples in the array of samples, wherein the processing parameter is selected from heating temperature, heating time, heating rate, cooling temperature, and cooling time.

Any method herein described, wherein the analyzing step uses an Ultraviolent-Visible (UV-VIS) spectrometer to measure polymer formation.

Any method herein described, wherein the sulfide source is selected from a group consisting of lithium sulfide, sodium sulfide, potassium sulfide or magnesium sulfide.

Any method herein described, wherein the analyzing step includes the steps of comparing the UV-VIS absorbance of each sample with the absorbance of a blank sample that underwent the same processing steps.

Any method herein described, wherein the at least one additional component is a solvent or a solvent selected from a group consisting of monoethanolamine, methanol, triethylene glycol, or monoethylene glycol.

Any method herein described, wherein the at least one additional component is an acid or a base to change the pH of one or more samples.

Any method herein described, wherein the at least one additional component is a dispersant.

Any method herein described, wherein the at least one additional component is a water soluble polymer; or a water soluble polymer selected from a group comprising polyvinyl sulfonate, polyvinylpyrrolidone, cellulose, polyethylene oxide, polysaccharide, derivatives thereof, and combinations thereof.

Any method herein described, wherein the at least one additional component is a salt or an inorganic or organic salt having a counter ion from Groups I and 2 on the periodic table or a neutral salt, an alkali salt or an acid salt.

Any method herein described, wherein the at least one additional component is an amine or a primary, secondary, tertiary or quaternary amine, and can be selected from a group comprising alkyl amines, alkyl-hydroxy amines, amino acids, amino saccharides, diamines, triamines, alkyl benzyl amines, or combinations thereof. Alternatively, the amine is selected from a group comprising methylamine, propylamine, monoethanolamine, isopropanolamine, tris(2-aminoethyl)amine, glucosamine, ethylene diamine, diethanolamine, diisopropanolamine, methyldiethanolamine, triethanolamine, diethylenetriamine, pyrrolidone, or derivatives thereof.

Any method herein described, wherein the at least one additional component is an alcohol selected from a group comprising methanol, ethanol, isopropanol, hydroxybenzenes (mono-, di-, and tri), lower carbon glycols, and combinations thereof.

Any method herein described, wherein the known heating temperature is between about 20° C. to about 120° C. and/or the known heating time is at between a few minutes to a few days but preferably is faster, e.g., 5-120 minutes or 30-60 minutes, or preferably about 35 and about 45 minutes.

As used herein, the term "triazine" refers to a class of nitrogen-containing heterocycles made by the reaction of low alkanolamines and/or methylamines with formaldehyde. These triazines have the general structures of:

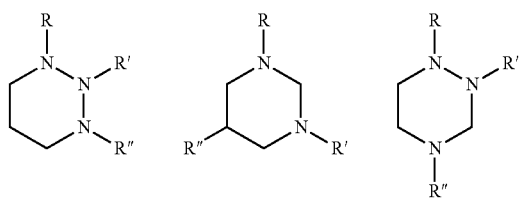

wherein R, R', and R" can be the same or different alcohols having a C1-C10 backbone. Exemplary triazines used for the mitigation of hydrogen sulfide include, but are not limited to, monomethylamine (MMA) triazine and monoethanolamine (MEA) triazine.

As used herein, the terms "chemical hydrogen sulfide mitigator", "scavenging chemical", and "sulfide scavenger" are used interchangeably to refer to scavengers or absorbents used to reduce or remove hydrogen sulfide from fluids.

As used herein, "pre-emptive measures" refers to plans or courses of actions that are decided upon before a hydrogen sulfide mitigation treatment commences, although the timing of the implementation of the measures can occur at any time before or during mitigation treatments.

As used herein, the terms "polymerization inhibitor" and "polymerization inhibiting additive" are used generally to refer to a chemical or composition that can slow, reduce, and/or prevent polymerization.

As used herein, the phrase "chemical mitigation package" refers to the combination of chemical hydrogen sulfide mitigator(s) and other optional additives or components that are used to scavenge hydrogen sulfide while reducing polymer fouling.

As used herein, the terms "array" or "array of samples" refers to an ordered series of two or more samples, wherein at least one variable or parameter in the samples, or processing of the samples, is changed. A simplified schematic of an array of samples is shown in FIG. 7. Depending on the number of samples, multiple variables can be modified and tested in the array. Further, duplicates and triplicates of a given sample, with the same set of variables and parameters, may be present in the array. Although each sample in the array typically only has one variable or parameter changed at a time, as shown in FIG. 7, it is possible to have two or more variables changed to evaluate the effect of the combination of the variables/parameters.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. The phrase "consisting of" is closed, and excludes all additional elements. The phrase "consisting essentially of" excludes additional material elements, but allows the inclusions of non-material elements that do not substantially change the nature of the invention. Any of these transition phrases can be interchanged with another in the claims, but in the interests of brevity, potential claims are not repeated using different transition phrases.

The following abbreviations are used herein:

| ABBREVIATION | TERM |
| --- | --- |
| DTA | Dithiazine |
| HPLC | High-performance liquid chromatography |
| IC | Ion chromatography |
| IPPA | Isopropanolamine |
| LC-MS | Liquid chromatography-mass spectrometry |
| MALDI-MS | Matrix assisted laser desorption ionization-mass spectrometry |
| MEA | Monoethanolamine |
| MEG | Monoethylene glycol |
| MeOH | Methanol |
| MMA | Monomethylamine |
| Py-GC/MS | Pyrolysis gas chromatography/mass spectrometry |
| SRB | Sulfate-reducing bacteria |
| TEG | Triethylene glycol |
| UPLC | Ultra-performance liquid chromatography |
| UV-VIS | Ultraviolet-visible spectroscopy |

BRIEF DESCRIPTION OF THE DRAWINGS

FIG. 7. A simplified schematic of an array of samples wherein only one parameter is changed per sample.

DESCRIPTION OF EMBODIMENTS OF THE DISCLOSURE

Figure 1A:
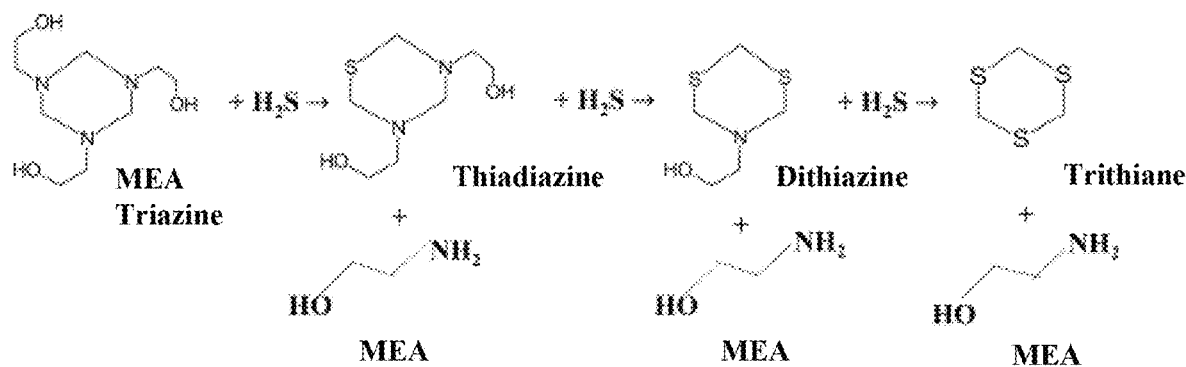
FIG. 1A. Reaction mechanism between MEA triazine and hydrogen sulfide.
Figure 1B:
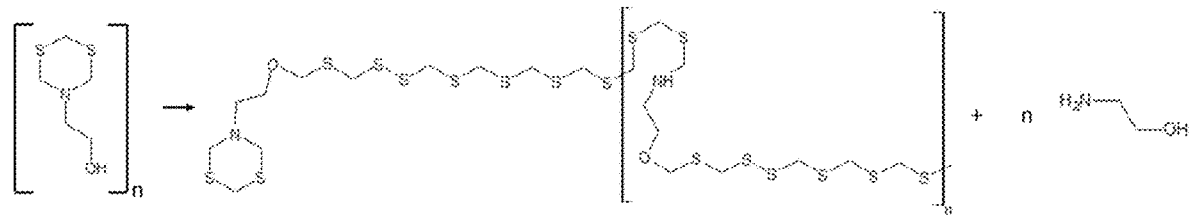
FIG. 1B. Polymerization mechanism for amorphous dithiazine.

The present disclosure provides a novel method of screening hydrogen sulfide scavenging chemical mitigators before mitigation treatments to determine if these chemical mitigators, or their reaction or degradation products, will polymerize after the mitigation treatment begins and foul the processing equipment. Once the amount of polymer formation, if any, is known, pre-emptive measures to reduce fouling can be performed before or during hydrogen sulfide mitigation treatments, instead of expensive remedial efforts to physically clean fouled equipment after polymerization has already presented a problem.

In more detail, the present methods are directed to the detection and quantification of polymerization, if any, formed during or after hydrogen sulfide mitigation treatment with chemical scavengers. The scavenging reactions result in reaction products that can react under certain conditions to form polymers capable of fouling the processing equipment. Formaldehyde-releasing chemical scavengers can also release formaldehyde and form one or more degradation products in the presence of hydrogen sulfide. Like the reaction products, these degradation products can also result in the formation of polymers that foul the processing equipment. Regardless of the source of the polymers, the fouling results in costly and time-consuming remedial measures to remove polymeric deposits.

The present methods are directed to predicting polymerization activity for scavenging chemical mitigators such as triazines and oxazoline ring-containing compounds under a variety of operating conditions. The present methods screen chemical mitigator packages comprising at least one scavenging chemical mitigator and a sulfide source, or a scavenging chemical's reaction or degradation product, to determine if polymers will form after mitigation treatments under particular conditions. In some embodiments, the elimination, modification, reduction, or inducement of polymerization is tested by combining the chemical mitigator package with one or more additional components or additives, and/or by modifying one or more operating parameters (pH, temperature, concentrations, and the like). Once the tests are run (either once or in repeated cycles of testing), the conditions that produce the least polymerization can then be selected and implemented as needed in oil and gas production and processing equipment.

Exemplary sulfide scavenging chemicals tested by the present methods include triazines and oxazoline ring-containing compounds such as MMA, MEA, and isopropanolamine (IPPA). Each of these compounds has a reaction product, and possibly a degradation product, that can be analyzed using the present methods to see if these products contribute to polymerization. For example, dithiazine (DTA) is a reaction product for MEA triazine that can polymerize. DTA can be combined with one or more additives, under a variety of conditions (temperature, pH, DTA concentration), to evaluate the ability to reduce or prevent amorphous dithiazine formation.

Currently, the industry standard for evaluating mitigation chemicals is a test using a sparging apparatus. The sparging apparatus is filled with a specific amount of the chemical mitigator and purged with hydrogen sulfide gas to mimic various "spend" levels of the chemical mitigator. Polymerization is then determined by gravimetric means or visible observations, neither of which is very sensitive. Further, each sample can take between 1 to 2 days, or longer, before polymerization occurs. This procedure significantly slows the treatment process.

The presently described methods improve upon the industry standard by creating a quicker, more sensitive method utilizing analytical instrumentation for the detection of polymerization for a variety of reaction conditions. This results in a high throughput method that can process 25 to 45 or more samples a day.

In one embodiment, at least one scavenging chemical mitigator plus additional optional components are combined with hydrogen sulfide (or a sulfide salt) in a buffered solution. The mixtures are processed under one or more sets of reaction conditions, and the resulting products are analyzed to determine if a polymer formed and measure the amount of polymer. This results in a high throughput method for quickly determining how a scavenging chemical mitigator or a combination of scavenging chemical mitigators and other components will polymerize under a variety of operational conditions such as reaction temperatures, reaction times, pH, and/or concentrations of the scavenging chemical mitigator(s). In some embodiments, solvents, acid/bases, dispersants, alcohols, salts, amines (primary, secondary, tertiary and quaternary), water soluble polymers, or other polymerization inhibitors are added to the sample solution to evaluate their ability to reduce or inhibit polymerization under various conditions.

In another embodiment, the sample solution is a reaction or degradation product of the scavenging chemical mitigator in a buffered solution with an optional additive such as a solvent or other polymerization inhibitor. As before, the mixtures are processed under one or more reaction conditions, and the resulting products are analyzed to determine if polymers formed and the amount of polymer. This alternate method allows for the direct analysis of a specific reaction or degradation product, without interference from other products or excess hydrogen sulfides. However, a sulfide source can be added to evaluate its effect on the polymerization of reaction or degradation products.

These embodiments allow for the addition of optional components that may be included in the hydrocarbon fluid, field solvent, or the chemical mitigation package. The optional components can be a solvent, a polymerization inhibitor or the like that is used to evaluate one or more potential pre-emptive measures. Alternatively, the optional component can be acids/bases for changing the pH of the test samples.

In yet another alternative, the optional component can be inorganic or organic salts, amines (primary, secondary, tertiary and quaternary), water soluble polymers, dispersants, and/or alcohols. Examples of optional components include, but are not limited to, solvents such as monoethanolamine, methanol, triethylene glycol, monoethylene glycol; water soluble polymers such as polyvinyl sulfonate, polyvinylpyrrolidone, cellulose, polyethylene oxide, or polysaccharide; salts such as inorganic or organic salt having a counter ion from Groups I and 2 on the periodic table or neutral, alkali, or acid salts; primary, secondary, tertiary or quaternary amines such as methylamine, propylamine, monoethanolamine, isopropanolamine, tris(2-aminoethyl)amine, glucosamine, ethylene diamine, diethanolamine, diisopropanolamine, methyldiethanolamine, triethanolamine, diethylenetriamine, pyrrolidone, or other alkyl amines, alkyl-hydroxy amines, amino acids, amino saccharides, diamines, triamines, alkyl benzyl amines; alcohols such as methanol, ethanol, isopropanol, hydroxybenzenes (mono-, di-, and tri), or lower carbon glycols; and, derivatives and combinations thereof.

Once the test sample is prepared it can be processed under a variety of conditions. Typically, the test samples are heated at known heating rates to known reaction temperatures for known amounts of time before being cooled to a known temperature for a known amount of time. The present methods allow for each of these conditions to be varied to evaluate the effects they may have on polymerization inducement, reduction or inhibition.

In some embodiments, the test samples are heated at a reaction temperature between about 20-120° C. In some embodiments, the test samples are heated to between about 20-85° C., or between about 80-120° C. or between about 40-105° C. Alternatively, the test samples are heated to about 23° C., 44° C., 48° C., 53° C., 57° C., 66° C., 85° C., 103° C. or 105° C.

The heating time is dependent on the scavenging process and can range from between about 5 minutes to multiple days, though faster times are preferred. In some embodiments, the heating time is selected based on measuring a blank sample heating time in the heater. Alternatively, the heating time is between about 30 minutes to about 60 minutes, more preferably between 35 and 50 minutes, and most preferably about 45 minutes.

After a sample is heated, it is cooling to a temperature that is less than about 30° C. to freeze the polymerization process and allow for consistent analysis. In some embodiments, the heated samples are placed in a water bath having a temperature of about 22° C. If needed, cooler temperatures could also be used, e.g., 4° C. The cooling time depends on the heating temperature and type of cooling mechanism. If using a water bath having a temperature of about 22° C., for example, the cooling time can vary between 5 and 30 minutes, preferably between about 10 and 20 minutes, and most preferably about 15 minutes.

Any analytical technique for polymer analysis can be used to evaluate the presence and amount of polymer formation, if any, in the processed test samples. Additionally, techniques that are not specific to polymer analysis, but that can determine the presence of suspended particles such as polymers can also be used. Exemplary analytical techniques include, but are not limited to, turbidity meters, UV-VIS spectroscopy, Raman spectroscopy, high-performance liquid chromatography (HPLC), ultra-performance liquid chromatography (UPLC), liquid chromatography-mass spectrometry (LC-MS), ion chromatography (IC), matrix assisted laser desorption ionization-mass spectrometry (MALDI-MS), pyrolysis gas chromatography/mass spectrometry (Py-GC/MS), and the like.

In some embodiments, spectroscopy is used to evaluate the presence of a polymer, and if any, quantify its amount when compared to an appropriate blank sample. Preferably, UV-VIS is used as it can quickly scan a range of wavelengths or a single wavelength, allowing for quicker sample processing. In some embodiments, the UV-VIS collects measurements at 900 nm as most organic molecules do not absorb this wavelength. Thus, any reduction in the light transmission will be due to the particles in the solution scattering light.

Once the presence and amount of polymer for each sample is known, conditions that produced the least polymerization can be used in pre-emptive measures employed before or during chemical mitigation treatments of a hydrocarbon stream. In some embodiments, the pre-emptive measures involve the use of one or more solvents or dispersants whose performance was evaluated using the methods disclosed herein. In other embodiments, the pre-emptive measures involve adjusting operating conditions such as reaction temperatures, reaction times, or pH in a reaction vessel. Combinations thereof are also possible.

A benefit of the high throughput nature of the presently described methods is that different reaction conditions, components, compositions, or pre-emptive measures can be tested simultaneously and directly compared to optimize the chemical mitigation treatments. For example, a combination of scavenging chemical mitigators and other components in the chemical mitigation package can be tested at different pH, heating temperatures, heating times, and/or solvent compositions in the same day. This not only allows for the optimization of a chemical mitigation package for reduced polymerization but also identifies mitigation treatment conditions (pH, temperature, concentration, solvent content, and the like) that can increase, reduce, modify, or inhibit polymerization for a given scavenging chemical mitigator. Likewise, different reaction products or degradation products can be quickly evaluated in the presence of polymerization inhibitors or other optional additives.

In some embodiments, the pre-emptive measures are the preparation of optimized combinations, or packages, of different kinds of scavenging chemical mitigators, polymerization inhibiting additives, and/or solvents to reduce or eliminate polymer formation. Alternatively, the scavenging chemical mitigator can be combined with an additive to prevent the scavenging chemical mitigator or its reaction products from reacting after the hydrogen sulfide has been reduced or eliminated.

In yet another alternative, the scavenging chemical mitigator can be combined with an additive that can slow, reduce, and/or prevent polymerization occurring in the fluid being treated. In another alternative, the fluid being treated can be cooled before mitigation treatments when using a scavenging chemical mitigator having a reaction product that polymerizes at high temperatures. Each of these pre-emptive measures can be quickly evaluated under a variety of mitigation conditions using the above screening methods.

Any sulfide source can be used in the present methods. While hydrogen sulfide is the target analyte in a hydrocarbon stream for mitigation treatments, hydrogen sulfide is highly toxic and flammable, making it difficult to work with. Thus, other sulfide sources can be used in the present methods. Preferably, sulfide salts are used, such as lithium sulfide, sodium sulfide, potassium sulfide, magnesium sulfide.

The sulfide salt and scavenging chemical mitigator can be dissolved or diluted in a buffering solution. The buffering solution may be an inorganic buffer that has a buffering pH between about 6 and about 8, and is soluble in the fluids to be treated. In some embodiments, the buffering solution is phosphate buffer, e.g., a 1M phosphate buffer. Alternatively, the buffering solutions can comprise a borate-based salt, or mixtures of phosphate and borate buffering salts in concentrations ranging from milliMolar to Molar.

In some embodiment of the present methods, the test samples also include optional components such as acids/bases or solvents. A variety of both polar and non-polar organic solvents that are normally used in the oil and gas industry can be used in the reaction mixtures in the present methods. Alternatively, the optional component is a field solvent. Some field solvents, such as monoethanolamine, methanol, triethylene glycol, and monoethylene glycol, can also act as polymerization inhibiting additive. In yet another alternative, the optional component can be inorganic or organic salts that are acidic, alkali, or neutral. In other embodiment of the present methods, the test samples also include optional components that are amines (primary, secondary, tertiary and quaternary), water soluble polymers, dispersants, and/or alcohols. As with the polar and non-polar organic solvents, a variety these components are normally used in the oil and gas industry, and can be used in the reaction mixtures in the present methods.

The disclosed screening methods allow for a quicker and more cost-effective chemical mitigation treatments. The screening methods determine the presence and amount of a polymer for a wide variety of operating conditions, scavenging chemical mitigators and their reaction or degradation products, combination of optional components such as polymerization inhibiting additives, or solvents to solubilize resulting polymers. This allows an operator to selectively determine the best chemical mitigation package and/or operating conditions for a reservoir to not only remove the hydrogen sulfide, but also reduce or eliminate fouling of the equipment by avoiding polymerization. This increases production and reduces cost associated with equipment down time and maintenance.

The following experiments are included to demonstrate embodiments of the appended claims using the above described autometathesis system. These examples are intended to be illustrative only, and not to unduly limit the scope of the appended claims. Those of skill in the art should appreciate that many changes can be made in the specific embodiments which are disclosed and still obtain a like or similar result without departing from the spirit and scope of the disclosure herein. In no way should the following examples be read to limit, or to define, the scope of the appended claims.

The presently disclosed methods were applied to samples comprising pure DTA to evaluate the effects of temperature, pH, DTA concentration and field solvent effects on amorphous DTA polymerization. Previous proof of concept experiments were performed using MEA triazine neutralized with hydrogen sulfide or sodium sulfide to produce DTA. However, the resulting DTA solution contained MEA from the scavenging reaction, which influenced polymerization independent of other additives. Thus, samples were prepared using pure DTA, which allows independent factor assessments of temperature, pH, DTA concentration and solvent effects on DTA polymerization.

A 20,000 mg stock solution of DTA (Toronto Research Institute) was prepared by adding the DTA to a 1M phosphate buffer at pH 7. DTA polymerization releases MEA, a base, which can overcome the phosphate buffer's buffering capacity if enough MEA is released. As such, all samples, except those which specifically change DTA concentration, used a standardized concentration of 2000 mg/L of DTA ("standard DTA amount") in buffer to limit this issue. For the samples used to study the effects of field solvents, various amounts of the solvents were also added to the 2000 mg/L DTA solutions.

An aliquot of each sample was heated using a heating block for a known heating time before being cooled. The heating time and heating temperatures were selected based on field conditions. Unless otherwise noted, the samples were heated to 105° C. for 45 minutes for the examples described herein. The heating time included the time required to heat the samples to the selected temperature and exposure time at that temperature. Sample containers were cooled to less than 30° C. immediately to "freeze" the polymerization at the given condition.

Samples being used to assess the effects of temperature on DTA polymerization were heated at their respective target temperatures. As before, the heating time was 45 minutes, and, after heating, the sample containers were cooled for analysis.

The content of each sample container was quantitatively transferred to another container with water and diluted. The absorbance measurements of the diluted samples were taken using UV-VIS spectroscopy. Each sample's absorbance was compared to the most polymerized sample in each series. The blank sample is the most polymerized sample in the examples; however, it is possible to add additives that may increase the extent of polymerization, resulting in blank not being the most polymerized sample. An operator would be able to choose an appropriate blank sample for comparing the absorbance.

Solvent Effects

Four common field solvents-monoethanolamine (MEA), methanol (MeOH), triethylene glycol (TEG), and monoethylene glycol (MEG)—were evaluated to determine their ability to inhibit the formation of polymerized DTA in heated samples. A series of samples were prepared with varying amounts of the field solvents being added to the standard DTA amount. The samples were adjusted to ensure the same initial pH conditions and minimal buffer capacity changes, before being processed and analyzed for absorbance from the polymerization of DTA.

Figure 2:
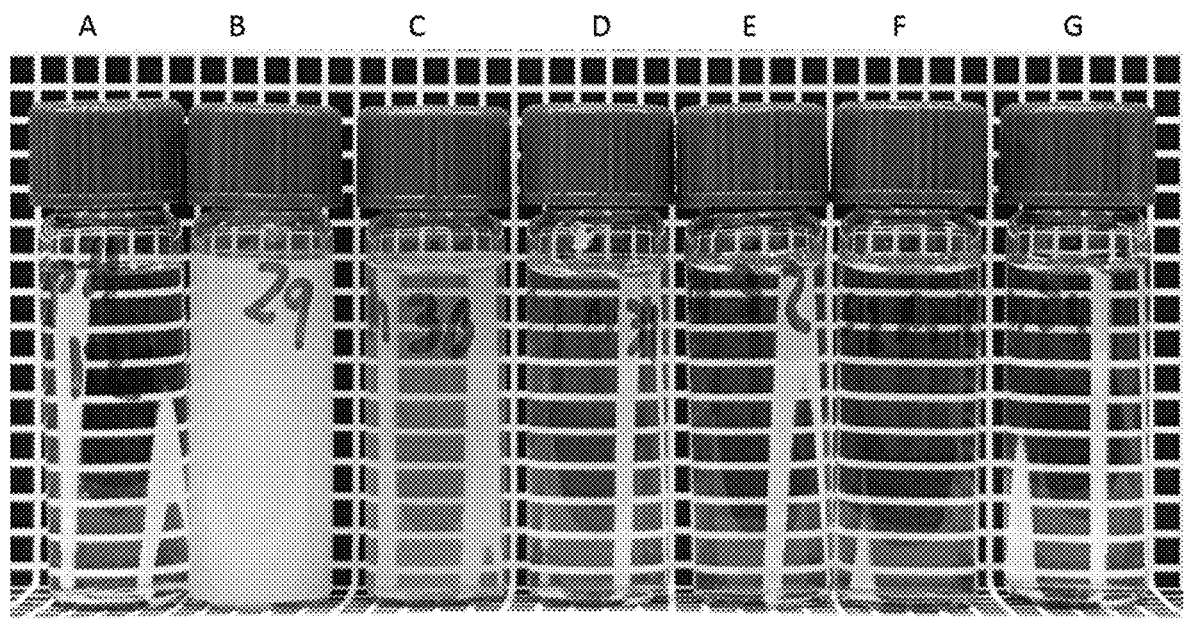
FIG. 2. Exemplary sample vials of dithiazine with no solvent and no heating (Vial A), no solvent and after heating (Vial B); and, increasing amounts of solvent after heating (Vials C-G). The heated samples were heated at 105° C. for 45 minutes.

FIG. 2 displays a series of samples with varying amounts of the MEA field solvent. Vial A is a sample of DTA without MEA before heating, and Vial B is DTA without MEA after being heated at 105° C. for 45 minutes and cooled. The sample in Vial B is cloudy and has the highest amount of turbidity due to the extensive polymerization of the DTA. Vials C-G have increasing amounts of MEA, and were also heated and cooled using the sample process as Vial B. These vials show a decrease in the cloudiness or turbidity of the samples, and thus a reduction of the polymerization of DTA. Hence, we can conclude that MEA inhibits polymerization under these conditions.

Similar trends in reduction of DTA polymerization were seen with the other three field solvents. As expected, increasing amounts of each field solvent reduced the polymerization of DTA. However, under the pH and heating conditions of this example, some inhibiting solvents reduced the polymerization to a much greater extent than others at lower solvent concentrations. For example, MEA reduced the polymerization to a much greater extent at a concentration of about 25 mL/L solution compared to TEG, MEG, and MeOH. Thus, additional samples with a higher concentration of MEA were prepared and tested.

Figure 3:
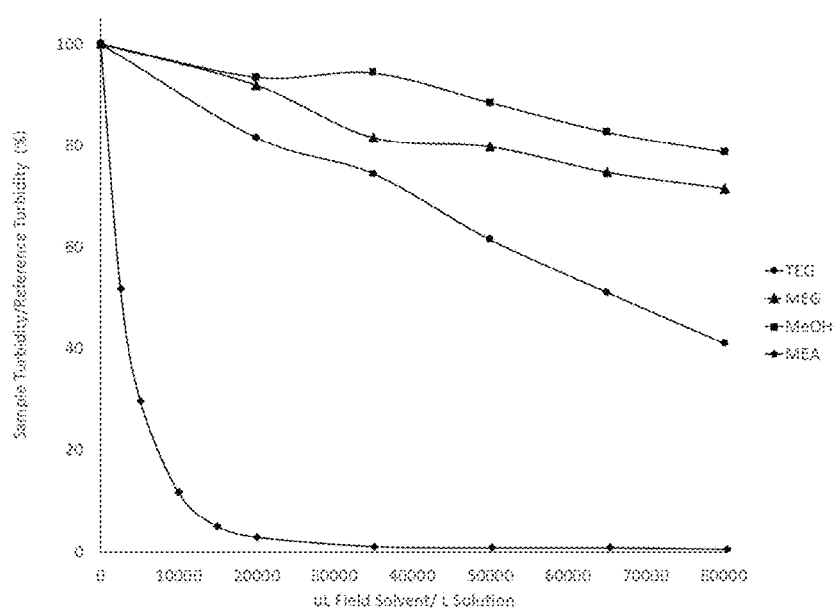
FIG. 3. Effects of increasing amounts of different solvents on the formation of amorphous dithiazine.

As shown in FIG. 3, the reduction in polymerization (decreased turbidity) occurred rapidly at lower concentrations of before slowing and leveling off with concentrations above about 40 mL MEA/L of the solution. It was found that the MEA began to have a diminishing effect as MEA concentrations rose past 20 mL/L. As such, other field solvents that had greater reductions in polymerization at lesser concentrations may be preferred depending on the fluid to be treated and operating conditions.

Other observations include the difference in polymerization reduction using MEG v. TEG. Though both solvents were glycol based, smaller amounts of TEG were able to decrease the polymerization, and thus turbidity, to a much greater extent than the same volume of MEG. A 5% MEG resulted in only a 20% reduction, compared to the 38% reduction observed with 5% TEG.

FIG. 3 provides a visual interpretation of the DTA polymerization's dependence of various field solvents and their concentrations. From this figure, it is clear that the relative solvent effectiveness is MEA>>>TEG>MEG>MeOH. The polymerization inhibition mechanism of each field solvent is not specifically known. Without being tied to a specific mechanism, the following mechanisms have been proposed but have not been confirmed. It is believed that the DTA exist in equilibrium between closed ring and open ring structures with polymerization occurring in the open ring configuration. MeOH, MEG and TEG may prevent DTA molecules from properly orienting so polymerization can occur between ring open structures (steric hindrance).

MEA seems have two methods of inhibition: steric hindrance and substitution. MEA steric hindrance may work as described above for the other solvents. MEA substitution hypothetically occurs as follows. A solution phase MEA bonds to the open ring structure at the free formaldehyde carbon of the DTA, yielding a transient molecule with two MEAs (one from the solution, the other originally present in DTA). As the molecule moves back toward the closed structure, one of the MEA is released yielding closed structure DTA and a free MEA (one originally from the solution or one originally present in DTA).

Regardless of the mechanism, each of the evaluated field solvents has some polymerization inhibition ability towards DTA. It is expected that the extent of inhibition of other reaction products, or degradation products, will vary for these solvents.

Figure 4:
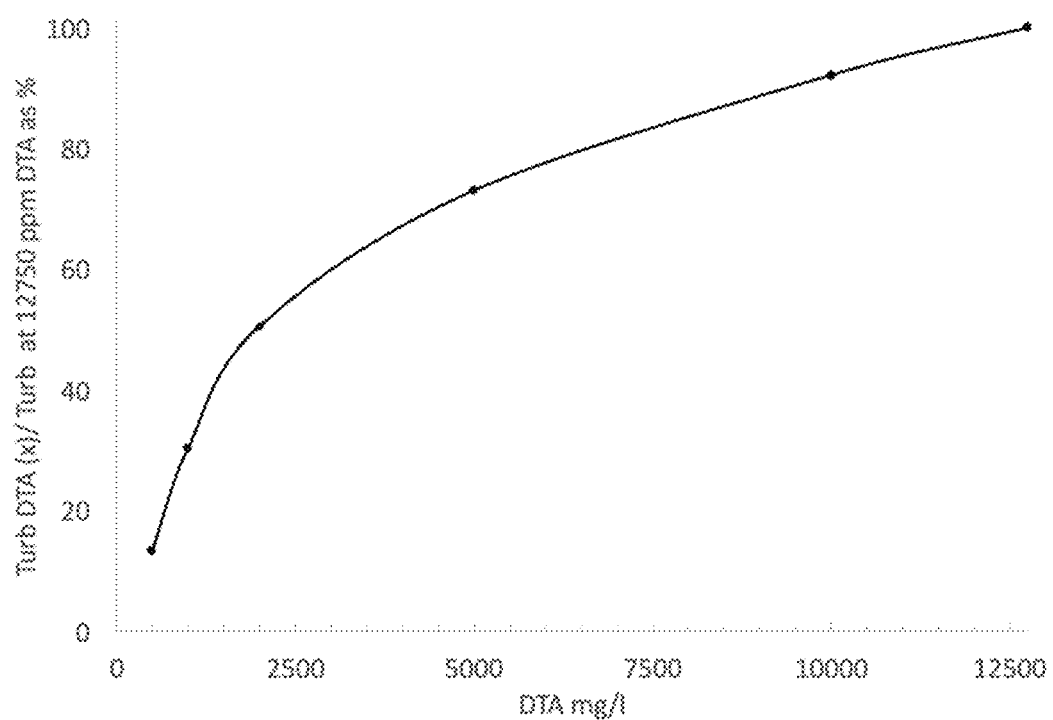
FIG. 4. Effects of increasing amounts of dithiazine on the formation of amorphous dithiazine.

DTA concentration greatly impacts the extent of its polymerization. FIG. 4 displays the increase in turbidity as the concentration of DTA increases. Turbidity rises linearly with concentration until the buffering capacity is exceeded and then curves over. This figure shows qualitative behavior. However, the higher DTA concentration clearly increases polymerization.

Figure 5:
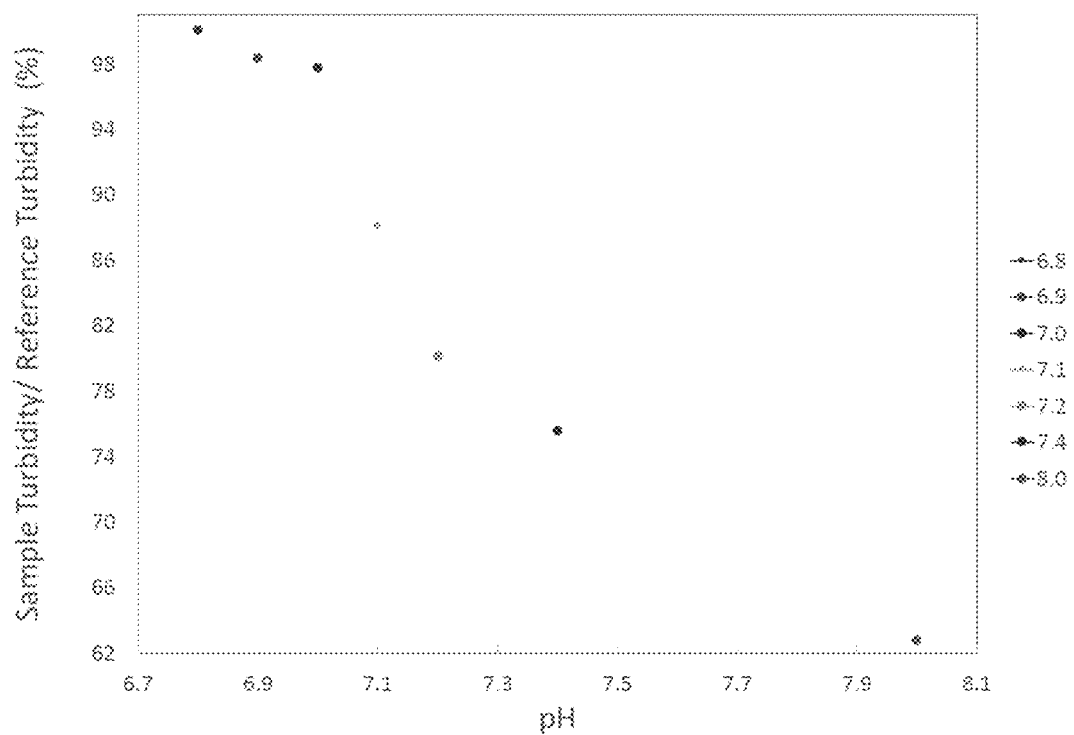
FIG. 5. Effects of pH on the formation of amorphous dithiazine.

As mentioned above, the DTA polymerization reaction releases a base (MEA) that can overcome the buffering capacity if enough MEA is released. FIG. 5 shows the drastic change in turbidity with pH change. As can be seen, increasing the pH reduced the polymerization of DTA under these sample conditions.

For pre-emptive measurements, the pH in a reactor vessel can be raised to reduce the polymerization and ultimate equipment fouling. In some processes, a combination of bases to increase the pH and solvents to reduce polymerization can be used to prevent equipment fouling.

Figure 6:
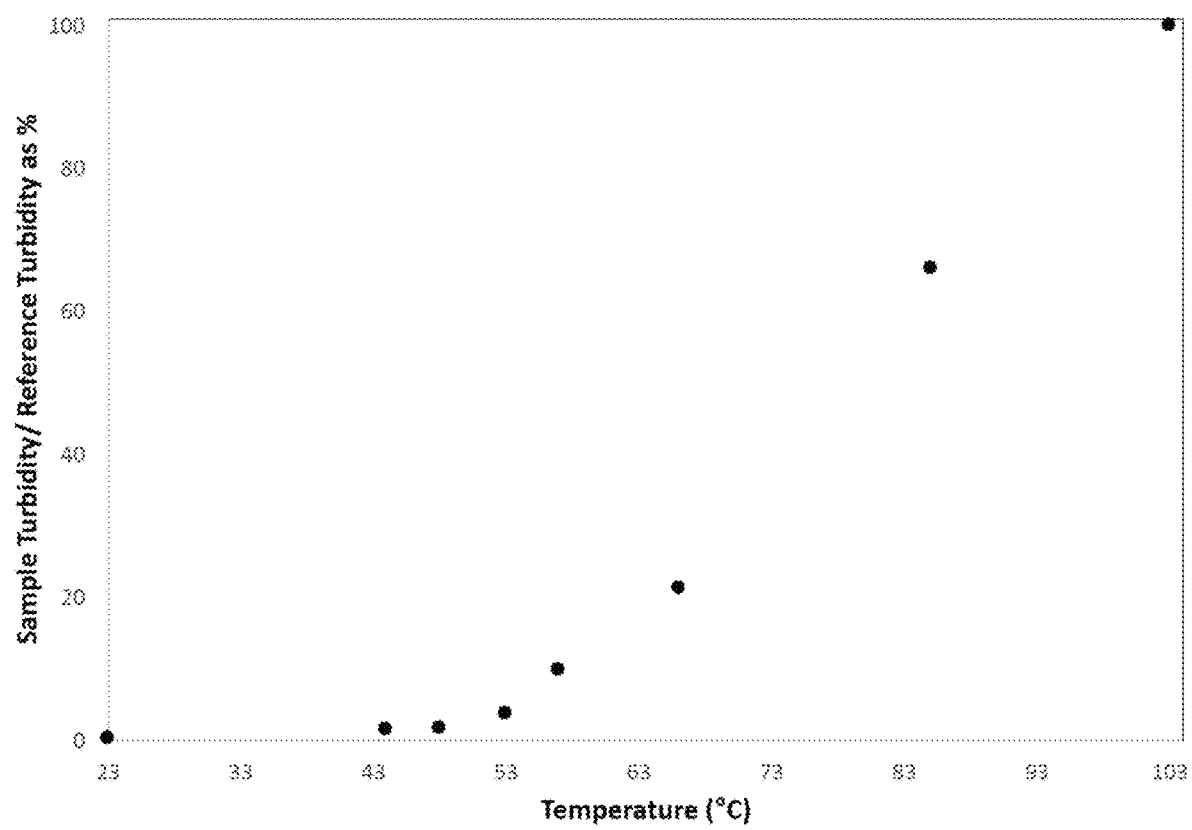
FIG. 6. Effects of reaction temperature on the formation of amorphous dithiazine.

Reaction temperatures were found to greatly impact the polymerization of DTA. FIG. 6 displays the increase in turbidity as the temperature of the samples increase. The polymerization slows significantly below 50° C. In view of these results, process systems can pre-cool scavenging areas as a pre-emptive measure to reduce polymerization. With this adjustment, polymer formation could be reduced even at 90+% MEA triazine spend rates. It is expected that cooling a fluid stream before mitigation treatments may be combined with other modifications, such as the addition of field solvents or pH adjustments.

The presently described high-throughput analysis using US-VIS absorbance allowed for the testing of multiple polymerization conditions in the same time frame. Understanding what variables can be modified, and how to modify, to reduce or inhibit polymerization allow for the development of pre-emptive measures before or during hydrogen sulfide mitigation. While some methods can be cost ineffective (increase pH, decrease temperatures), adjustments to multiple measures can be combined to reduce or inhibit fouling on the equipment in a cost effective manner.

The following references are incorporated by reference in their entirety for all purposes.
WO2018001604
U.S. Pat. No. 8,920,568

The invention claimed is:

1. A method of identifying conditions that influence polymer formation in sulfide scavenger treatments, said method comprising:
 a) preparing an array of samples, wherein each sample comprises a sulfide scavenger and a sulfide in a buffer and, optionally, at least one additional component;
 b) varying a parameter in one or more samples in said array of samples, said parameter selected from pH, concentration and identity of sulfide scavenger, concentration and identity of sulfide, and concentration and identity of said additional component(s);
 c) processing said array of samples to induce polymer formation;
 d) analyzing said processed array of samples to measure polymer formation;
 e) selecting one or more parameter(s) that minimize polymer formation; and
 f) utilizing said selected one or more parameter(s) in a sulfide scavenger treatment to prevent polymerization.

2. The method of claim 1, wherein the processing step comprises:
 a) heating the samples to a temperature between about 40° C.-120° C. for between 5 minutes to up to 2 days; and,
 b) cooling the samples to a temperature at or below 30° C. for between 5 minutes to 30 minutes,
 c) wherein, said processing step further comprises varying a processing parameter in one or more samples in said array of samples, said processing parameter selected from heating temperature, heating time, heating rate, cooling temperature, and cooling time.

3. The method of claim 1, wherein said analyzing step uses an Ultraviolent-Visible (UV-VIS) spectrometer to measure polymer formation.

4. The method of claim 1, wherein said optional additional component is a solvent, an acid, a base, a salt, an alcohol, a water soluble polymer, an amine, a dispersant, or a combination thereof.

5. The method of claim 1, wherein said optional additional component is a solvent selected from a group consisting of monoethanolamine, methanol, triethylene glycol, or monoethylene glycol.

6. The method of claim 2, wherein said samples are heated to about 40° C.-120° C.

7. The method of claim 2, wherein said samples are heated to about 80° C. to about 120° C.

8. The method of claim 1, wherein said analyzing step comprises quantitatively measuring the degree of polymer formation.

9. The method of claim 1, further comprising the step of selecting one or more parameter(s) that minimize polymer formation in said reaction product of each reaction sample, said parameter(s) selected from pH, concentration of dithiazine, concentration and amount of each additional component, heating temperature, heating time, heating rate, cooling temperature, and cooling time.

10. The method of claim 1, wherein said at least one additional component is an acid, a base, or a buffer to change the pH of one or more samples.

11. A method of optimizing a sulfide mitigation treatment, said method comprising:
 a) preparing an array of samples, wherein each sample comprises dithiazine in a buffer and, optionally, at least one additional component;
 b) varying a parameter in one or more samples in said array of samples, said parameter selected from pH, concentration of dithiazine, and concentration and identity of said additional component(s);
 c) processing said array of samples to induce polymer formation; and
 d) analyzing said processed array of samples to measure polymer formation;
 e) selecting one or more parameter(s) that minimize polymer formation; and
 f) utilizing said selected one or more parameter(s) to prevent polymerization in an optimized sulfide mitigation treatment.

12. The method of claim 11, wherein the processing step comprises:
 a) heating the samples at to a temperature between about 40° C.-120° C. for between 5 minutes to up to 2 days; and,
 b) cooling the samples to a temperature at or below 30° C. for between 5 minutes to 30 minutes,
 c) wherein, said processing step further comprises varying a processing parameter in one or more samples in said array of samples, said processing parameter selected from heating temperature, heating time, heating rate, cooling temperature, and cooling time.

13. The method of claim 11, wherein said analyzing step uses an Ultraviolent-Visible (UV-VIS) spectrometer to measure polymer formation.

14. The method of claim 11, wherein said optional additional component is a solvent, an acid, a base, a salt, an alcohol, a water soluble polymer, an amine, a dispersant, or a combination thereof.

15. The method of claim 11, wherein said optional additional component is a solvent selected from a group consisting of monoethanolamine, methanol, triethylene glycol, or monoethylene glycol.

16. The method of claim 12, wherein said samples are heated to about 40° C.-120° C.

17. The method of claim 12, wherein said known heating temperature is varied samples are heated to about 80° C. to about 120° C.

18. The method of claim 11, wherein said analyzing step comprises quantitatively measuring the degree of polymer formation.

19. The method of claim 11, further comprising the step of selecting one or more parameter(s) that minimize polymer formation in said reaction product of each reaction sample, said parameter(s) selected from pH, concentration of dithiazine, concentration and amount of each additional component, heating temperature, heating time, heating rate, cooling temperature, and cooling time.

20. A method of quantifying polymer formation, comprising:
 a) mixing dithiazine in a buffer to form a blank sample;
 b) mixing dithiazine and at least one additional component in a buffer to form one or more reaction samples;
 c) processing the blank sample and the one or more reaction samples to form a reaction product within each sample;
 d) measuring the degree of polymer formation in the reaction product of each reaction sample, wherein said measuring step comprises using an Ultraviolent-Visible (UV-VIS) spectrometer to obtain an absorbance at one or more wavelengths for the blank sample and each reaction sample, and comparing the difference in UV-VIS absorbance of the blank sample and each reaction sample to measure the degree of polymer formation in said reaction product of each reaction sample.

* * * * *